United States Patent [19]
Atalla

[11] Patent Number: 6,088,449
[45] Date of Patent: Jul. 11, 2000

[54] TRI-SIGNATURE SECURITY ARCHITECTURE SYSTEMS AND METHODS

[75] Inventor: Martin M. Atalla, Atherton, Calif.

[73] Assignee: Tri-Strata Security, Inc., Redwood City, Calif.

[21] Appl. No.: 08/740,946

[22] Filed: Nov. 5, 1996

[51] Int. Cl.[7] ...................................................... H04L 9/00
[52] U.S. Cl. .................................. 380/21; 380/25; 380/49
[58] Field of Search .................................. 380/21, 44, 29, 380/25, 45, 49

[56] References Cited

U.S. PATENT DOCUMENTS

| 5,115,467 | 5/1992 | Esserman | 380/44 |
|---|---|---|---|
| 5,351,293 | 9/1994 | Michener et al. | 380/21 |

FOREIGN PATENT DOCUMENTS

| 0 032 107 | 7/1981 | European Pat. Off. . | |
|---|---|---|---|
| 0 447 063 A2 | 9/1991 | European Pat. Off. | 9/8 |
| 0 602 335 | 6/1994 | European Pat. Off. . | |
| 42 43 908 | 6/1994 | Germany | 9/32 |
| 9 200 876 | 12/1993 | Netherlands | 19/7 |
| 2 223 614 | 4/1990 | United Kingdom . | |
| 95 09498 | 4/1995 | WIPO . | |
| WO 97/16902 | 5/1997 | WIPO . | |

OTHER PUBLICATIONS

McGovern, "Varying Encryption Keys for a Single Call", Motorola Technical Developments, vol. 24, Mar. 1995, Schaumburg, pp. 61–62.

Wadzinske, "Key Pointer Rekeying", Motorola Technical Developments, vol. 25, Jul. 1995, Schaumburg, p. 136.

Radlo, "Cryptography in Cyperspace", New Matter, Jul. 24, 1995, vol. 20, No. 3, pp. 44–48.

IEEE in Houston, Globecom '93. IEEE Global Telecommunications Theory Mini–Conference. Technical Program Conference Record (Cat. No. 93CH3250–8), Proceeding of Globecom '93. IEEE Global Telecommunications Confere, ISBN 0–7803–0917–0, 1993, New York, NY, USA, IEEE, USA, pp. 164–170 vol. 1, XP000428048 Tsubakiyama H et al: "Security for Information Data Broadcasting System with Conditional–Access Control" see p. 165, Right–Hand Column, Paragraph 1; Fig. 3.

Primary Examiner—Gail O. Hayes
Assistant Examiner—Ho S. Song
Attorney, Agent, or Firm—Skjerven, Morrill, MacPherson, Franklin & Friel LLP

[57] ABSTRACT

An encryption system and method utilizes a bit stream, called a "master signature", which is divided into bytes with each byte being assigned a byte address. A portion of the master signature, called an "access signature" is randomly selected to encode the message to be transmitted. Both a sender and a receiver have the same access signature. The particular portion of the access signature to be used to encrypt and decrypt a message is identified at the sender by identifying the address of the first byte in this portion of the access signature and the number of bytes sequentially related to this first byte which together with the first byte will be used to encode the message to be transmitted. This information is sent to the receiver. Thus, using this information, the sender can encrypt and the receiver can decrypt the message using the same portion of the access signature.

22 Claims, 7 Drawing Sheets

TRI-SIGNATURE SECURITY ARCHITECTURE SYSTEMS AND METHODS

FIELD OF THE INVENTION

This invention relates to secure communications and in particular to systems and methods for establishing secure communications between user and network computer, between user and user and between network and network, all on an insecure network.

BACKGROUND OF THE INVENTION

U.S. patent application Ser. No. 08/552,029, filed Nov. 2, 1995, now U.S. Pat. No. 5,960,086 issued on Sep. 28, 1999, herein incorporated by reference in its entirety, discloses unified end-to-end security methods and systems for operating on insecure networks. In the '029 application, systems and methods are provided which allow a working key (i.e. the key used to encrypt a message) to be used only once and then changed in a manner which is essentially random, fast and unique to each user. In accordance with the invention disclosed in the '029 application, a user accessing a network computer is issued a randomly selected bit stream of a given length, typically 10,000 bytes for an individual user and of the order of megabytes for a computer node. This bit stream, called the "master signature", is divided into bytes, and each byte is assigned a byte address. Thus, each byte can be uniquely identified by an address. When this byte is addressed, the bits associated with this byte can be read out. In one embodiment of the '029 application, a split signature, asymmetric mode technique is used to secure communications between computer and users. From the computer's "master signature", a portion is randomly selected. This portion, called the "access signature", is placed at the user. The computer, which could be at a bank or any service provider, retains the corresponding addresses filed under the user's I.D. This access signature retains both the bit information in the bytes selected from the master signature as well as the addresses of those bytes in the master signature. To establish a secure communication session between a bank and a user, each selects a random set of addresses from the user's access signature. These independent sets of addresses are exchanged between sides. Each side, the bank and the user, now having both sets of addresses, obtains the corresponding bit contents which determine a unique session signature. Of importance, the particular bytes making up the session signature are never transmitted between the bank computer and the user. All that is transmitted are the addresses of the bytes making up the session signature. Both the user's terminal and the bank's computer have the identical session signature (also called the "session key").

With this process, the session keys at both the user's terminal and the bank's computer have been synchronized without ever transmitting the session key over any type of network. Of importance, the session signature is never transmitted in any form, encrypted or otherwise, over any network.

The invention in the '029 application provides a unique key which is capable of being changed before each transaction between a user and a central computer and which allows great flexibility, ease and reliability of key management, and high speed performance.

SUMMARY OF THE INVENTION

In accordance with this invention, a session key is uniquely identified by taking a segment of the access signature to form a session signature and identifying the address of the initial byte in the session signature and the length of the session signature (i.e. the number of bytes or bits in the session signature). As a result, the number of bits required to transmit the addresses of the bytes in the session signature is reduced substantially. Indeed, if the session signature consists of, for example, 100 bytes from the access signature (or, for that matter, any other number of bytes from the access signature), only a few bytes need be addressed in order to identify any length sequence of bytes which make up the session signature. In accordance with this invention, the address of the initial byte in the session signature together with bits defining the number of bytes in the session signature are called a "pointer". If desired, the session signature can be of a predefined length, or the session signature can be as long as the message itself, rendering unnecessary the bits defining the length of the session signature.

In another embodiment of this invention, the bytes in the master signature are divided into any number of independent subsets, for example four subsets, each subset representing an access signature. A session signature is then defined.

In accordance with this invention, a session signature does not have to be determined by one side alone. Rather, both users have the same access signature (i.e. the network computer at a bank, for example, and the user have the same access signature). The user sends an identification number (i.e. an I.D.) plus at least one pointer to the network computer. The network computer picks at least one pointer (the exact number of pointers picked by the network computer corresponds to the number of pointers picked by the user) and sends these pointers back to the user once the user's I.D. is verified. Both the user and the bank can pick from their access signature the session signature by exclusively ORing the session signature derived from the user's at least one pointer with the session signature derived from the bank's at least one pointer. For example, if the user sends two pointers to the network computer and the network computer sends two pointers to the user, the user and the network computer each have four pointers. Four segments are derived from these four pointers. The access signature at both the user and the network computer has been divided into two independent compartments. So there will be at both the user and the network computer two segments from compartment "1" and two segments from compartment "2". The network computer generates pointer P1 and pointer P2 from compartments 1 and 2, respectively. The user generates pointer P1' and pointer P2' from compartments 1 and 2, respectively. The user and the network computer each add the addresses 1 and 1' associated with pointers P1 and P1' and the addresses 2 and 2' associated with pointers P2 and P2' to obtain two new addresses $\overline{P1}$ and $\overline{P2}$, module N (where N is the number of bytes in each compartment). By exclusively ORing the segments associated with pointers $\overline{P1}$ and $\overline{P2}$, a session key is obtained.

Of importance, an access signature can be obtained from a master signature in the same manner as described above to obtain a session signature from an access signature. For example, to obtain an access signature divided into two independent compartments, the master signature is divided into four independent compartments. Four pointers P1, P2, P3 and P4, one from each compartment, are then generated. The segments identified by pointers P1 and P2 are then exclusively ORed as are the segments identified by pointers P3 and P4 to produce the first and second compartments, respectively, of the user's access signature. The pointers P1, P2, P3 and P4 remain at the network computer in the user's file. As a feature of this invention, the bytes in the two compartments of the access signature at the user are sequentially numbered and, therefore, these sequential bytes are totally decoupled from the original addresses in the master signature.

In another embodiment of this invention, an encryption method called "flash encryption" which is particularly suitable for multi-media applications, is provided. The use of the exclusive OR function provides the simplest and fastest encryption/decryption process possible. The exclusive OR function provides the highest possible performance provided the process utilizing the exclusive OR function is cryptographically secure.

In an alternative embodiment, the pointers which are exchanged to establish a session signature between the user and the network computer are themselves masked. This eliminates the possibility of acquiring the user's access signature from the transmissions. To do this, two short "session signatures" are generated from pointers P1, P2. A masking signature is obtained by exclusively ORing these two session signatures. Two new pointers P3 and P4 are randomly selected from compartments 1 and 2 of the access signature. Pointers P3 and P4 are exclusively ORed with the masking signature and the resulting masked pointers P3 and P4 are sent to the user along with pointers P1 and P2, all in one transmission. The user now uses pointers P1 and P2 to obtain the masking signature which in turn is used by the user to obtain pointers P3 and P4. Using pointers P3 and P4 the user generates the session signature.

In many instances, a message is longer than the key used to encrypt the message. Under these circumstances, the key is used repeatedly to encrypt one message. The bits making up a segment of the message equal in length to the key are encrypted simultaneously. While the process can be analyzed by someone trying to break the key, the breaking of the encryption is a formidable task particularly if the message is not too much longer than the key and if a particular key is used only once. Shuffling the bytes in the key before re-use using a random data shuffling process known to both the receiver and the sender dramatically increases the difficulty of breaking the key. For any message length, unbreakable security is obtained when the key length equals the message length. Utilizing flash encryption, the data stream and the key stream are exclusively ORed to provide encrypted data which is transmitted from the transmitter to a receiver. At the receiver the data stream is again exclusively ORed with the key stream to decrypt the message and provide a clear data stream. The encryption and decryption can be done in real time.

When the bytes in the master signature are divided into two independent subsets of bytes (i.e., two "compartments" of bytes), and each compartment contains N bytes, the maximum number of key streams based upon a single pointer using sequential addresses to identify the bytes in each session signature is N. This number is independent of the stream length desired. For n compartments, the maximum number of streams is Nn−1. Thus for four compartments each containing one million bytes, the maximum number of key streams is eighteen million. To increase the number of possible different key streams where each key is made up of N bytes, two separate sequences of session signatures identified by pointers P1 and P2 can be exclusively ORed together to provide a derived key of N bytes length. The derived key of N bytes length can be changed by shifting the bytes in one of the two session signatures by one address left or right and then exclusively ORing the resulting shifted session signature (which, if shifted left, starts with the first byte instead of the zero byte) with the second unshifted session signature (still starting with the zero byte). The process of shifting the bytes in one of the session signatures before exclusively ORing the first session signature with the second session signature yields N different derived key stream segments using the same two session signatures. One therefore obtains, for a given pair of session signatures identified by pointers P1, P2, each session signature being of length N, N key stream segments. In practical applications the use of a key stream no greater than 0.01% of the maximum length possible is recommended to provide security. Moreover, since the pointers used to obtain a key stream are not known outside of the server, even if a key stream is somehow discovered, the key stream cannot be used to develop the master signature.

In accordance with another embodiment of this invention, random pointers to different session signatures and a master signature can be used to obtain two separate key streams for full duplex (i.e. two way or bidirectional) operation. Each key stream can be derived as described in any of the ways above. In one embodiment, the key stream used to transmit information from the receiver (Party B) to the transmitter (Party A) is derived from a different set of bytes in the master signature than the set of bytes used to derive the key stream used to transmit information from the transmitter (Party A) to the receiver (Party B). Alternatively, a different set of pointers can be used to generate the derived key stream used to transmit information from Party A to Party B as compared to the pointers used to generate the derived key stream used to transmit information from Party B to Party A.

In still another embodiment of this invention, a master signature is divided into two subsets of bytes each subset stored in a separate compartment. These two compartments, known as the "shared key buckets", are available to and shared with all clients authorized to use the bytes in the shared key buckets for encrypting information. Another two compartments of bytes called the "DES-keys buckets" reside securely only in the security server. The client accesses the security server and using the pointer exchange process establishes a private access line ("PAL") which provides identification and authentication between the client and the security server. The security server issues to the client a permit which is a pair of pointers P1, P2 randomly selected from the two compartments of the shared key bucket. These pointers P1, P2 are transmitted to the client secured by the previously established PAL.

The client having received P1, P2 and having the shared key bucket thereby is able to determine the encryption key using techniques described above. The client then uses the encryption key so derived to encrypt the document to be stored in memory somewhere in the system. The server also derives two DES-keys from the DES-keys bucket. These two DES-keys are determined by two separate pointers $p_1$, $p_2$, independent of pointers P1, P2 used to derive the session signature from the shared key bucket. A derived DES-key is obtained by exclusively ORing the two DES-keys. The DES-key so derived is used to encrypt P1, P2 to provide a seal. The document, encrypted by the encryption key (i.e. the session signature) at the client, is then stored in memory in the system along with P1, P2, encrypted at the server by the DES-key to provide a seal, and the DES-key pointers $p_1$ and $p_2$.

The procedure which is followed for an authorized client to decrypt a document so secured is to:

1. Pull the encrypted document, seal and $p_1$, $p_2$ from memory.

2. Establish a PAL between the client and the security server;

3. Transmit the seal and DES pointers from storage to the security server;

4. Security server unlocks seal and transmits pointers P1, P2 to the client (the seal besides including P1, P2 can also include other data such as the time stamp and the client I.D.); and 5. Client decrypts the document using pointers P1, P2.

This procedure makes it extremely difficult for any unauthorized party to obtain the stored information because the unauthorized party will not have the information required to determine the DES-key.

This invention will be more fully understood in light of the following detailed description taken together with the following drawings.

DETAILED DESCRIPTION

The following description is meant to be illustrative only and not limiting. Other embodiments of this invention will be obvious in view of the following description to those skilled in the encryption arts.

Figure 1:
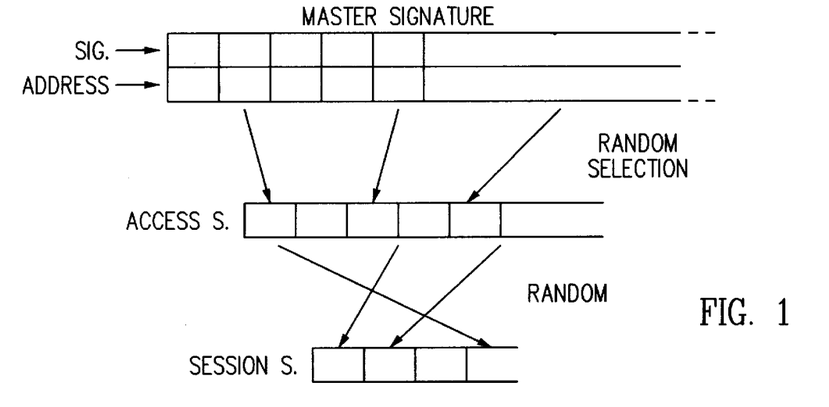
FIG. 1 shows the use of a master signature to yield a first subset of bytes, the first subset of bytes being known as an access signature, which in turn is used to yield a smaller second subset of bytes known as the session signature.

FIG. 1 illustrates the relationship between a master signature made up of a plurality of bytes derived as described in the above mentioned patent application Ser. No. 08/552,029, now U.S. Pat. No. 5,960,086, and the access signature and session signature derived therefrom. As shown in FIG. 1, each byte in the master signature has a corresponding address. The access signature is made up of a first subset of bytes selected typically, although not necessarily, randomly from the master signature. The access signature includes not only the first subset of bytes but the addresses of these bytes in the master signature. The session signature is made up of a second subset of bytes selected typically, but not necessarily, randomly from the access signature. Each session signature byte also has associated therewith the address of that byte in the master signature.

One feature of the three signature security system of this invention (called the "Tri-Signature Security System") utilizing the master signature, access signature and session signature is that for one byte segments the address itself may be longer than a byte. In other words, the addresses of the bytes in a given signature can be longer than the signature itself. For example, if a master signature contains one megabyte of data, the address of each byte in the master signature requires three bytes; that is the address is three times the length of the byte in the signature being addressed. This occurs because twenty (20) bits are necessary to provide the addresses for one million bytes and since addresses are specified in byte-sized units, three bytes, corresponding to 24 bits, are generally necessary to provide such an address space. This overhead may not be acceptable in many applications.

Figure 2:
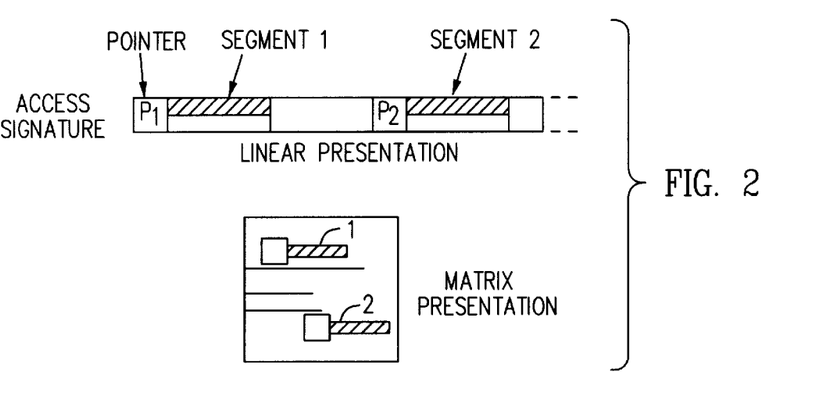
FIG. 2 shows the representation of two subsets of bytes derived from an access signature where each subset is identified by a pointer P1, P2 identifying the address of a selected byte in the subset.

FIG. 2 illustrates one solution to this problem. In FIG. 2 a particular segment of bytes in an access signature is identified by a pointer Pi. The pointer Pi identifies the address of the first byte in the segment of bytes to make up a session signature together with information as to the length of the session signature. Thus pointer P1 identifies segment 1 within the access signature and pointer P2 identifies segment 2 within the access signature. FIG. 2 illustrates both a linear and matrix presentation of segment 1 and segment 2. The number of bits necessary to define the address of segment 1 and segment 2 will be substantially fewer than required to identify the address of each byte in each segment. In FIG. 2 once a given pointer is known, the other information which must be known in order to identify the segment represented by that pointer is the rule used to derive the segment from the pointer. For example, the segment preferably is made up of the bytes represented by sequential addresses beginning with and following the pointer address. Alternatively, a segment can be made up of every byte having an even address following the byte identified by the pointer or by every byte having an odd address following the address identified by the pointer up to a maximum number of bytes. Or the segment can employ every third byte sequentially following the pointer or every fourth byte sequentially following the pointer up to a maximum number of bytes. A large number of different possible algorithms are available for selecting the sequence of bytes related to the pointer and the above description of exemplary algorithms is not meant to limit the various types of algorithms that can be used to identify the bytes in a sequence identified by a given pointer. For example, while segments have been described above as being made up of bytes following the address identified by the pointer, segments can as easily be made up of bytes leading the address identified by the pointer.

Each party utilizing the particular master signature must know, of course, the algorithm to be utilized in deriving a segment of bytes, given a pointer, from an access signature.

Figure 3:
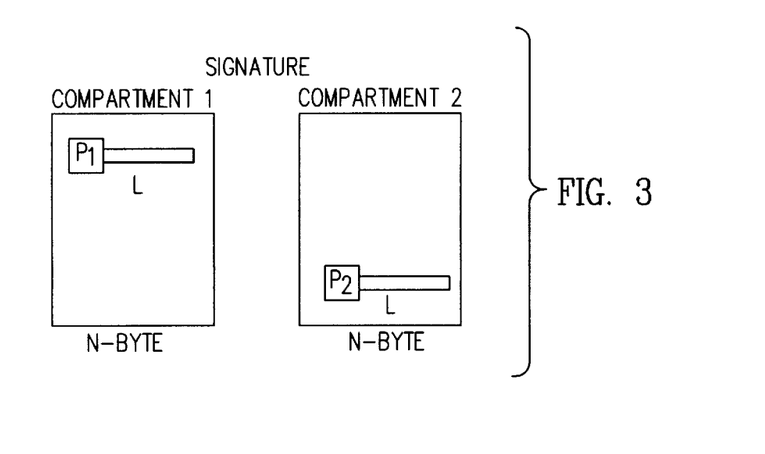
FIG. 3 shows two compartments of bytes derived from a master signature, each compartment containing N bytes together with the derivation of a first subset of bytes identified by pointer $P^1$ in the first compartment and a second subset of bytes identified by pointer $P^2$ in the second compartment.

FIG. 3 illustrates the use of compartment 1 and compartment 2, each containing N bytes derived from a master signature, to provide two session signatures each of length L. Typically, compartments 1 and 2 are made up of non-overlapping bytes from a master signature. If desired, compartments 1 and 2 can contain overlapping bytes. A session signature of length L identified by pointer P1 is shown in compartment 1 while a session signature of length L identified by pointer P2 is shown in compartment 2. Compartments 1 and 2 each are made up of N bytes selected from the master signature. Each compartment can be considered equivalent to an access signature.

Pointers P1, P2 are typically randomly selected. The segment L identified by each pointer is then read out from the access signature. If the start address for a pointer Pi is near the end of the compartment, the segment will loop back to the beginning of the compartment to pick up the necessary bytes. The two segments P1 and P2 can then be exclusively ORed to provide a single session signature. With N bytes in each compartment, the number of possible pair combinations (P1, P2) is $N^2$. Thus for an access signature with 10,000 bytes (that is with 10,000 bytes in each compartment) the total number of possible session signatures is $10^8$.

Figure 4:
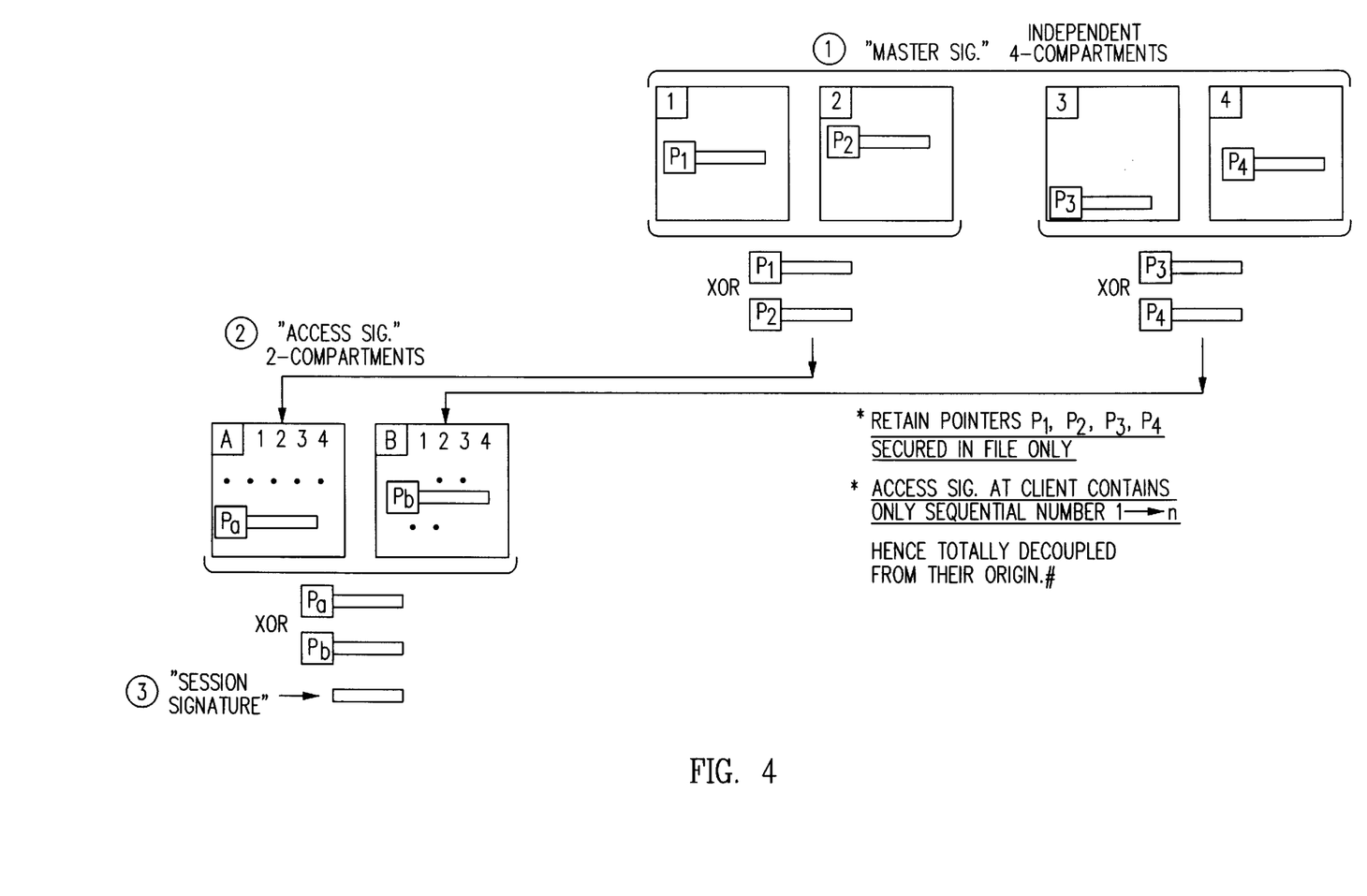
FIG. 4 shows the use of four independent compartments of bytes derived from a master signature to derive a session signature totally decoupled from the master signature.

FIG. 4 illustrates one method for implementing the tri-signature process utilizing a master signature, an access signature and a session signature. As shown in FIG. 4, the master signature is divided into four independent compartments (i.e. no overlapping bytes between compartments), namely compartments 1, 2, 3 and 4. Each compartment, which corresponds to an access signature, has identified in it a sequence of bytes beginning with the byte identified with a pointer to that byte's address. Thus compartment 1 has a sequence of bytes of length L identified by pointer P1, compartment 2 has a sequence of bytes of length L identified by pointer P2, compartment 3 has a sequence of bytes of length L identified by pointer P3, and compartment 4 has a sequence of bytes of length L identified by pointer P4. The sequences of bytes identified by pointers P1 and P2 are then exclusively ORed to yield a new sequence of bytes 0, 1, 2, . . . L. The sequence of bytes identified by pointers P3 and P4 are also exclusively ORed to yield a second sequence of bytes 0, 1, 2, . . . L. The two sequences of bytes obtained by these exclusive ORings are placed in two compartments each denoted as an "access signature". The addresses of the bytes in these two sequences begin with zero ("0") and increase chronologically to a number corresponding to the maximum number of bytes in each sequence which is "L". Thus the addresses of the bytes in the two compartments of the access signatures are totally decoupled from the addresses of the bytes in the master signature. The resulting access signatures can then be utilized to derive a session signature by exclusively ORing two subsets of bytes, one selected from the compartment A and the other selected from the compartment B, both compartments A and B making up the access signature.

In the embodiment of FIG. 4, pointer P1, P2, P3 and P4 are retained in the server only. The access signature at the client contains only the sequentially addressed bytes 1, 2, 3, . . . L together with the sequential addresses of these bytes. For the client to derive the session signature, the pointers Pa and Pb are transmitted to the client to allow the client to derive the session signature from access signatures A and B at the client's terminal using one of the above described techniques. The addresses of the bytes in the access signature at the client are totally decoupled from the addresses of the corresponding bytes in the compartments 1, 2, 3, and 4 at the server.

For each client obtaining an access signature, the pointers P1, P2, P3 and P4 relating to that access signature are stored at the server in that client's file. What the client receives are two access signatures (i.e. one access signature made up of two separate compartments), the addresses of the bytes in which are sequential numbers beginning with one ("1") and sequentially increasing from there. The result is that the addresses of the bytes in the access signatures at the client's terminal are decoupled from the addresses of the bytes in the master signature from which the access signatures are derived.

To go from the access signature to the session signature, the set of pointers Pa, Pb defining the sequential bytes in the client's access signatures which make up the session signature are transmitted from the server to the client. The client then derives the session signature by exclusively ORing the sequences derived from the client's access signatures using the pointers. Thus the session signature is also decoupled from the master signature.

Figure 5:
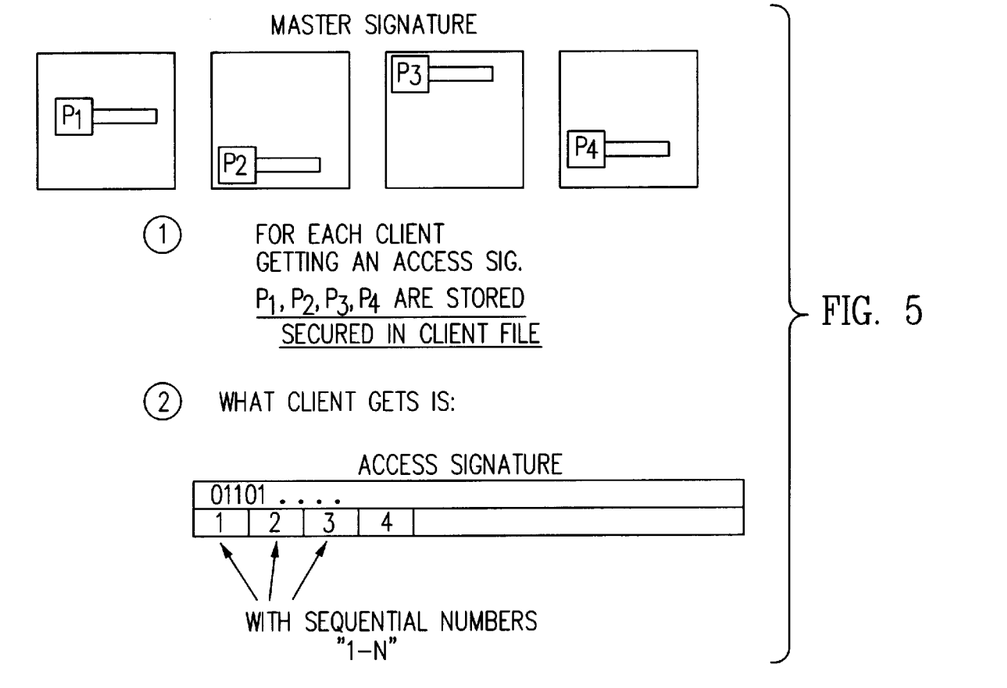
FIG. 5 shows four compartments of bytes derived from a master signature wherein the pointers to four sets of bytes, one set from each compartment, are secured in the client file at the server and the client merely receives the pointers which allows the client to identify those portions of the access signature which will be used to derive the session signature.

FIG. 5 illustrates the master signature broken up into four subsets of bytes with four segments of bytes identified by pointers P1, P2, P3 and P4, respectively, being derived from the four subsets of bytes, each subset of bytes being of equal length. And as shown in FIG. 5 the client receives two access signatures with sequential addresses 1, 2, 3, . . . N for the bytes in each access signature.

Figure 6:
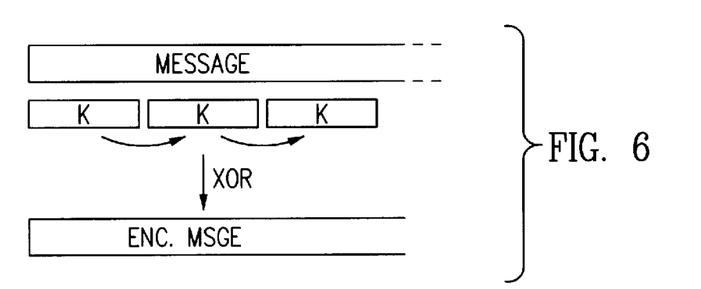
FIG. 6 shows the encryption of a message using a session signature shorter than the message by repetitively using the same session signature.

FIG. 6 illustrates the use of an encryption key shorter than the message to encrypt the message. As shown in FIG. 6 the encryption key of K bytes is used to encrypt a message of many times K bytes by encoding the first K bytes of the message with the encryption key using exclusive OR gates and then encoding the second K bytes of the message with the same K bytes from the encryption key. This process is repeated until the entire message is encoded. Thus the key is used repeatedly to encrypt one message segment, equal in length to the key, at a time. This technique, called "flash encryption", is particularly useful for multi-media applications. The exclusive OR function is the easiest, simplest and fastest encryption/decryption process possible. The exclusive OR function provides the highest possible performance provided the process is cryptographically secure. The breaking of the code using this process is a formidable task particularly if the message is not too much longer than the encryption key and provided further that the encryption key is used only once.

It is possible to shuffle the K bytes making up the encryption key before reuse using a random data shuffling process. This dramatically increases the difficulty of decrypting the message.

Figure 7:
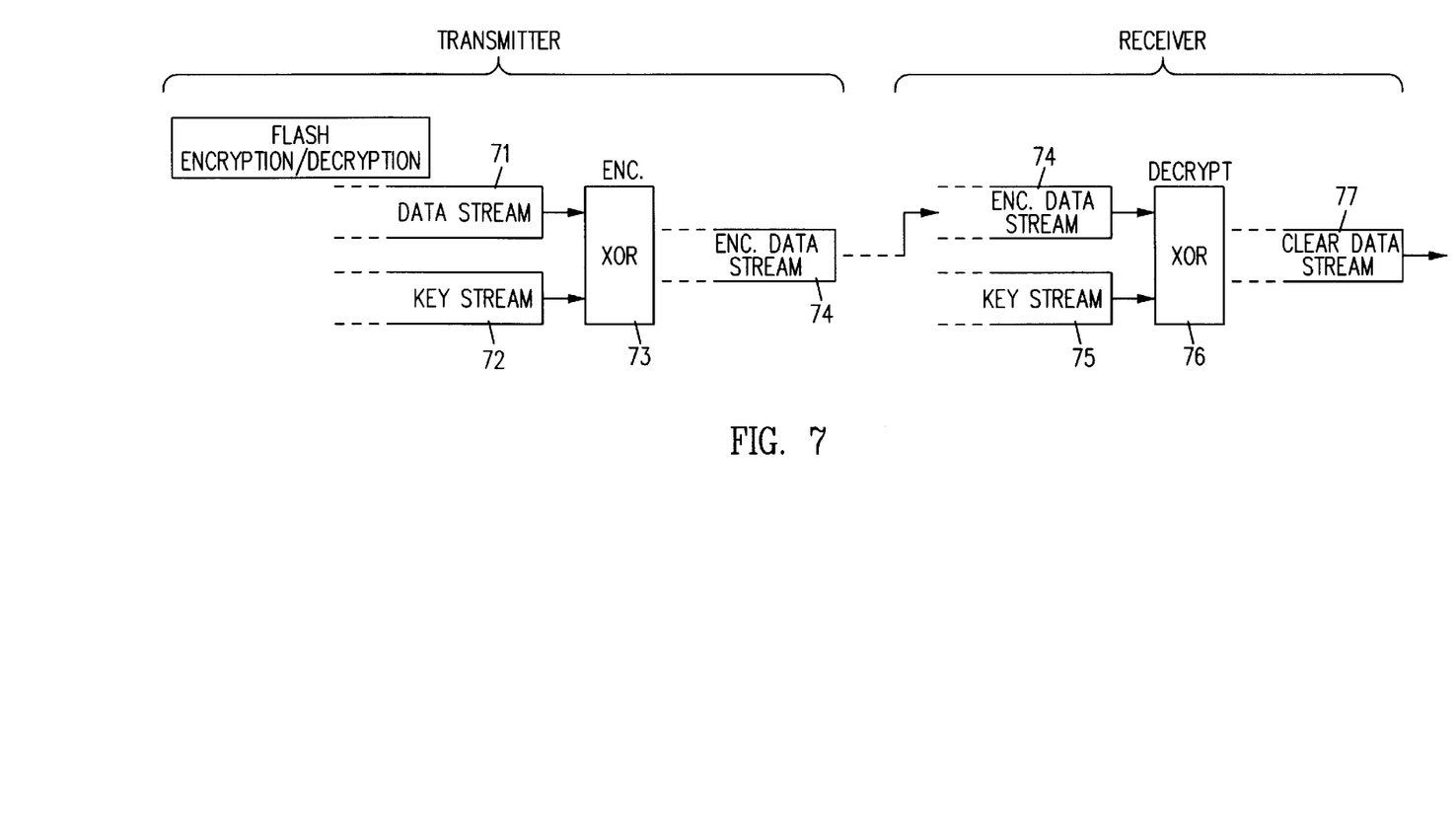
FIG. 7 shows flash encryption utilizing the exclusive OR function in accordance with this invention.

For any message length unbreakable security is obtained when the key length equals the message length. Typically, random key streams can be used to encrypt a stream of data utilizing the exclusive OR function for highest performance. As shown in FIG. 7, a flash encryption/decryption system utilizes a data stream 71 together with a key stream 72 each being input to a corresponding input terminal of a two input terminal exclusive OR gate 73. The exclusive OR gate 73 produces on its output terminal an encrypted data stream 74. The encrypted data stream 74 is transmitted to a receiver where the encrypted data stream 74 is transmitted to one input lead of exclusive OR gate 76 and the encryption key 75 is transmitted to the other input lead of exclusive OR gate 76. A clear data stream 77 is thus produced on the output terminal of exclusive OR gate 76. The exclusive OR processing of the transmitted data using the system of FIG. 7 is extremely economical in terms of hardware utilized and also is fast, allowing real time encrypting and decrypting.

Figure 8:
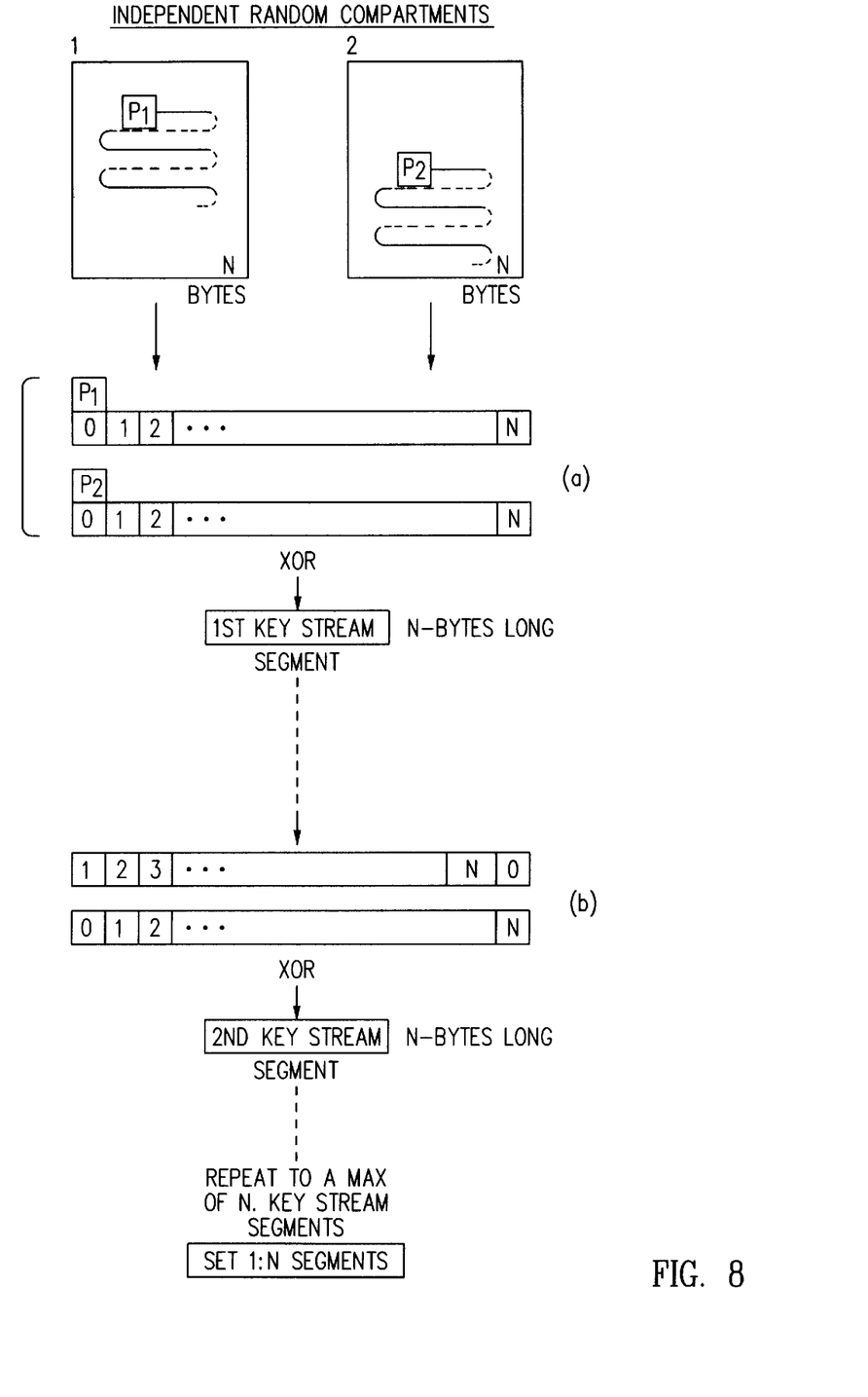
FIG. 8 shows the use of the exclusive OR function to derive up to N key stream segments each up to N bytes long from two randomly selected compartments each containing N bytes selected from a master signature.

FIG. 8 illustrates the use of two subsets or compartments of bytes from a master signature each subset containing a number of bytes in excess of N. A subset of N bytes is then selected from compartment 1 by use of pointer P1 and a subset of N bytes is selected from compartment 2 by use of pointer P2. Exclusively ORing these two sequences of bytes yields a first encryption key stream segment N bytes long. Additional encryption key segments can be obtained from the two N byte long segments designated by pointers P1 and P2 by sequentially shifting the bytes in segment P1 by one place to the left (or right) and then exclusively ORing the shifted segment of bytes with the segment identified by pointer P2 to obtain an additional encryption key N bytes long. This process can be repeated to obtain N encryption key segments.

In practical applications it is recommended that one uses no more than 0.01% of the maximum length of the master signature for the segments identified by pointers P1 and P2 which are to be exclusively ORed to obtain the encryption key segment. Since the pointers used to obtain a key stream are not known, even if a key stream is discovered, the key stream cannot be used to trace back to the source data.

Figure 9:
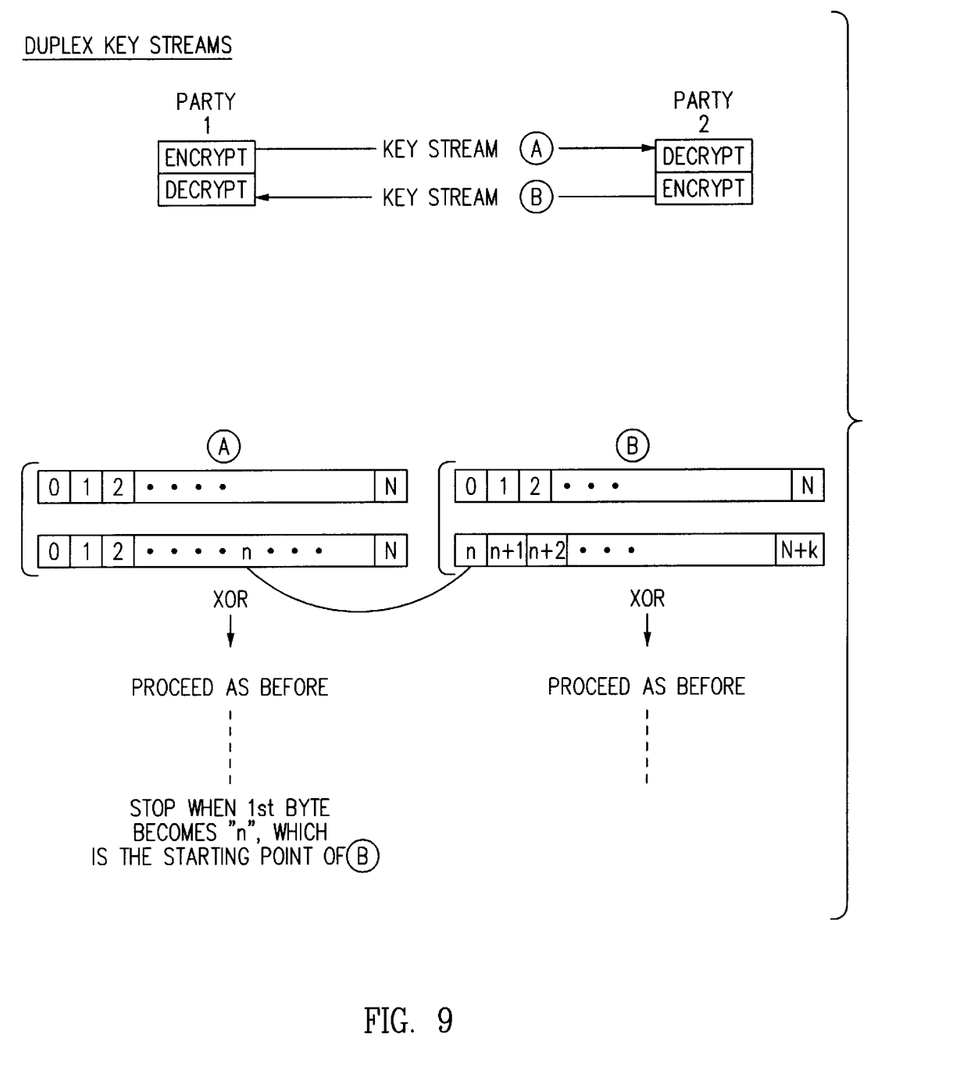
FIG. 9 shows a duplex key stream where two separate key streams A and B are derived from the same master signature, each key stream though being independent of the other key stream.

FIG. 9 illustrates duplex key streams wherein Party 1 and Party 2 each have an encryption key stream to be used for transmitting information from one party to the other party. Thus as shown in FIG. 9, Party 1 utilizes encryption key stream A to transmit information from Party 1 to Party 2. Party 2 uses encryption key stream B to transmit information from Party 2 to Party 1. The encryption key stream A can be obtained by exclusively ORing two segments of bytes obtained from the access signature at Party 1. The encryption key stream B can be obtained similarly by exclusively ORing two segments of bytes obtained from the same access signature in Party 2. However, at least one of the sequence of bytes at Party A or Party B is not overlapping with the other sequence of bytes at the other party. The sequences of bytes can be permutated as described above in conjunction with FIG. 8 to yield unique encryption key streams. However as shown in FIG. 9, the sequence of bytes which is utilized to yield the encryption key stream A will not include any sequence of bytes which has as the first byte the $n^{th}$ byte which is the starting point of the sequences of bytes used to yield encryption key B.

Figure 10:
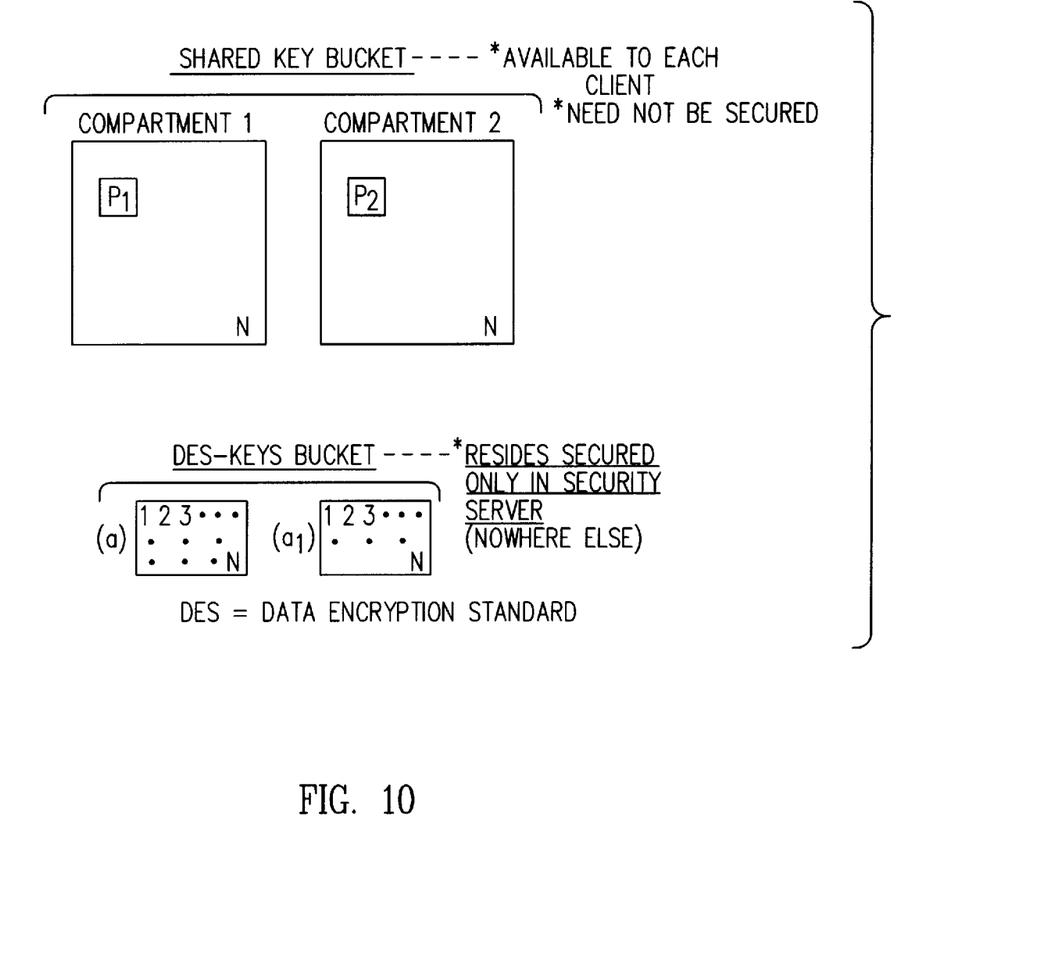
FIG. 10 shows the shared key bucket and DES key bucket embodiment where the DES key resides only in the security server and the shared key bucket resides at the security server and at those clients authorized to communicate with the security server.

FIG. 10 illustrates the shared bucket concept. In the shared bucket concept, the bytes in a master signature are divided into two subsets, namely compartment 1 and compartment 2. A particular segment of bytes in compartment 1 is identified by pointer P1 and another segment of bytes in compartment 2 is identified by pointer P2. The bytes in compartments 1 and 2 are available to each client who utilizes the server containing the shared key bucket. The server also has a DES-keys bucket which resides only in the server. The server will establish a private access line ("PAL") which provides I.D. and authentication between the client and the security server. The system allows the transmission of what is called permits and seals to allow the storage of secured documents and the accessing of secured documents by authorized clients or for secured messaging between clients. To provide communication between the server and a client, the client accesses the security server and using the pointer exchange process establishes a private access line which, in a manner described in the above referred to patent application Ser. No. 08/552,029 provides identification and authentication between the client and the security server. The security server then issues a permit to the client which is a pair of pointers P1, P2 randomly selected from the two compartments of the shared key bucket. The pointers P1, P2 are transmitted to the client secured by the previously established Private Access Line.

The client, receiving this information is able to encrypt the document to be transmitted or stored in memory somewhere in the system. The server then derives two DES keys from the DES keys bucket. These two DES keys are determined by two separate pointers $p_1$, $p_2$, independent of the pointers P1, P2 used to derive the session signature from the shared key bucket. A derived DES key is obtained by exclusively ORing the two DES keys. The DES key so derived is used to encrypt P1, P2 to provide a "seal". The seal and the DES pointers $p_1$, $p_2$ are sent to the user. The document, encrypted by the encryption key at the client, together with pointers P1, P2, encrypted at the server by the DES key to provide a seal, and the DES pointers $p_1$, $p_2$, are stored in memory somewhere in the system.

To decrypt a document so secured, the client

1. Establishes a PAL between the client and the security server;

2. Transmits the seal and the DES pointers $p_1$, $p_2$ from storage to the security server;

3. Causes the security server to unlock the seal using the DES pointers $p_1$, $p_2$ and the DES key bucket thereby to obtain and send the pointers P1 and P2 to the client along with the encrypted document; and 4. Decodes, at the client, the encrypted document using a session key obtained using the unsealed pointers P1, P2.

In accordance with this invention, a masking technique is used to mask the transmitted access signature addresses (these addresses are required to obtain a session signature) and thus eliminate the possibility of retrieving the user's access signatures from the transmitted addresses. To do this, two pointers P1 and P2 are specified by the user. Two additional pointers P1' and P2' are also specified at the main computer. However, only the user's pointers P1 and P2 are transmitted to the main computer. The main computer then uses the user's pointers P1 and P2 to generate an additional set or pair of address pointers $\overline{P1}$ and $\overline{P2}$. The way this is done is to add P1 from the user to P1' generated at the computer to generate $\overline{P1}$ and to add P2 from the user with P2' at the computer to generate $\overline{P2}$. $\overline{P1}$ and $\overline{P2}$, in the previous embodiment, were used to generate a session signature. They will now be used for a different purpose. $\overline{P1}$ and $\overline{P2}$ are used to generate a small sequence of bytes in a first compartment and a second compartment respectively. These bytes are then exclusively ORed together to generate a masking signature. This masking signature is then used by the computer to mask two pointers P3 and P4 independently selected by the computer. These independently selected pointers P3 and P4 are encrypted by exclusively ORing pointers P3 and P4 with the masking signature. Then the computer sends the pointers P1' and P2' along with the encrypted pointers P3 and P4 to the user. The user then is able to use the pointers P1' and P2' along with pointers P1 and P2 already at the user to generate the masking signature and then to use this masking signature to decrypt the encrypted pointers P3 and P4. The pointers P3 and P4 are then used to generate the session signature for use in encrypting information to be transmitted from the computer to the user and vice versa.

While a number of embodiments of this invention have been described, other embodiments will be obvious in view of this description.

What is claimed is:

1. A method for securing transmission of information between a first party and a second party which comprises:

providing at the second party a sequence of bits;

providing at the first party and at the second party a first subset of bits selected from said sequence of bits;

generating at the second party from said first subset of bits a second subset of bits for use in encrypting the information;

identifying at the first party the second subset of bits by means of a single address sent from the second party to the first party;

encrypting at the first party the information to be transmitted to the second party using said second subset of bits; and transmitting the encrypted information from the first party to the second party.

2. The method of claim 1 wherein the sequence of bits is arranged in a sequence of bytes each byte having a unique address.

3. A method for securing transmission of information between a first party and a second party which comprises:

providing at the second party a sequence of bits;

separating said sequence of bits (hereinafter denoted as the "master signature") into four separate compartments, the bits in each compartment not overlapping the bits in the other compartments;

generating from the first and second compartments a first sequence of bits and a second sequence of bits;

generating from the third and fourth compartments a third sequence of bits and a fourth sequence of bits;

exclusively ORing the first sequence of bits and the second sequence of bits to obtain a first derived sequence of bits;

exclusively ORing the third sequence of bits and the fourth sequence of bits to obtain a second derived sequence of bits;

transferring the first derived sequence of bits and the second derived sequence of bits to the first party and retaining the first derived sequence of bits and the second derived sequence of bits at the second party;

at both the first party and the second party, dividing the first derived sequence of bits and the second derived sequence of bits into a first derived sequence of bytes and a second derived sequence of bytes and providing sequential addresses for the bytes in the first derived sequence of bytes and for the bytes in the second derived sequence of bytes;

deriving at the second party from the first derived sequence of bytes and the second derived sequence of bytes a first address and a second address, respectively;

transferring to said first party said first address and said second address;

using said first address and said second address to generate a first subset of bytes and a second subset of bytes respectively from said first derived sequence of bytes and said second derived sequence of bytes at both the first party and the second party;

exclusively ORing at said first party and at said second party said first subset of bytes and said second subset of bytes to form a third subset of bytes (hereinafter denoted as the "session signature");

encrypting at the first party the information to be transmitted to the second party using the session signature; and transmitting the encrypted information from the first party to the second party.

4. The method of claim 3 wherein the first sequence of bits, the second sequence of bits, the third sequence of bits and the fourth sequence of bits are of equal length.

5. The method of claim 3 wherein the addresses of the bytes in said first derived sequence of bytes and the addresses of the bytes in said second derived sequence of bytes are chronologically increasing from a selected initial address, the addresses of the bytes in the first derived sequence of bytes and of the bytes in the second derived sequence of bytes being independent of the addresses of the bytes in the master signature.

6. A method for securing transmission of information from a sender to a receiver which comprises:

providing at the receiver a unique sequence of bits associated with the sender;

providing at the sender and the receiver a first subset of bits selected from said unique sequence of bits;

generating at the receiver from said first subset of bits a second subset of bits for use in encrypting the information;

identifying at the sender the second subset of bits by means of a single address sent from the receiver to the sender, said single address identifying a selected grouping of bits in said second subset of bits;

encrypting at the sender the information to be transmitted using said second subset of bits; and transmitting the encrypted information from the sender to the receiver.

7. A method for securing transmission of information from a sender to a receiver which comprises:

providing at the receiver a unique sequence of bits associated with the sender;

providing at the sender and the receiver a first subset of bits selected from said unique sequence of bits;

generating at the receiver from said first subset of bits a second subset of bits for use in encrypting the information;

sending from the receiver to the sender a pointer containing at least the single address of a selected byte in said second subset of bits thereby to allow the sender to identify the second subset of bits in accordance with a pre-arranged algorithm;

encrypting at the sender the information to be transmitted using said second subset of bits; and transmitting the encrypted information from the sender to the receiver.

8. The method of claim 7 wherein said single address is the address of the first byte in said second subset of bits.

9. The method of claim 7 wherein said pointer includes information identifying not just the address of the first byte in said second subset of bits but also the number of bytes in said second subset of bits.

10. A method for securing transmission of information from a sender to a receiver which comprises:

providing at the receiver a unique sequence of bits associated with the sender;

generating at the receiver from the unique sequence of bits four separate compartments of bits, the bits in each compartment being independent of the bits in the other compartments;

generating four pointers, one pointer for each compartment, each pointer identifying a sequence of bytes to be derived from the compartment of bits corresponding to that pointer;

exclusively ORing the sequences of bytes identified in the first compartment and the second compartment using the first pointer and the second pointer to obtain a first derived sequence of bytes;

exclusively ORing the sequences of bytes identified in the third compartment and the fourth compartment to yield a second derived sequence of bytes;

storing said first derived sequence of bytes and said second derived sequence of bytes at both the receiver and the sender;

assigning to the bytes in said first derived sequence and the bytes in said second derived sequence sequentially increasing addresses;

identifying at the sender the first derived sequence of bytes and the second derived sequence of bytes by means of a first address and a second address sent from the receiver to the sender;

deriving at both the sender and the receiver a session signature from said first derived sequence of bytes and said second derived sequence of bytes;

encrypting at the sender the information to be transmitted using said session signature; and transmitting the encrypted information from the sender to the receiver.

11. The method of claim 10 wherein the steps of identifying and deriving comprise:

deriving at the receiver a first pointer and a second pointer to identify a first subset of bytes and a second subset of bytes in said first derived sequence of bytes and said second derived sequence of bytes, respectively; and transmitting the first pointer and the second pointer to the sender; and exclusively ORing at both the sender and the receiver the first subset of bytes and the second subset of bytes to derive a third subset of bytes, said third subset of bytes being a session key.

12. The method of claim 11 wherein the step of encrypting at the sender the information to be transmitted using said session of signature comprises the step of encrypting at the sender the information to be transmitted using said session key.

13. The method of claim 6 including the additional step of de-encrypting at the receiver the information transmitted from the sender to the receiver using said second subset of bits.

14. The method of generating a sequence of bits (hereinafter called a "session signature") for use in encrypting information to be transmitted from a first terminal to a second terminal which comprises:

placing a series of bytes (hereinafter denoted as an "access signature") at a first terminal and a second terminal, each byte in the access signature having a unique address identified by additional bits;

generating at the first terminal at least one first pointer identifying the first byte in a first sequence of bytes in said access signature, said at least one first pointer comprising at least one first address;

generating at the second terminal at least one second pointer identifying the first byte in a second sequence of bytes in said access signature, said at least one second pointer comprising at least one second address;

transferring from the first terminal to the second terminal the first pointer and from the second terminal to the first terminal the second pointer; and generating at both the first terminal and the second terminal the sequence of bits to make up the session key by exclusively ORing the sequence of bytes derived from the first pointer with the sequence of bytes derived from the second pointer.

15. The method of claim 14 wherein the first terminal generates at least one first address to designate at least one sequence of bytes and the second terminal generates at least one second address to generate a second sequence of bytes.

16. The method of claim 14:

wherein the first terminal generates two addresses, a first address and a second address to generate a first sequence of bytes from said access signature and a second sequence of bytes from said access signature;

wherein the second terminal generates two addresses, a third address and a fourth address, to generate a third sequence of bytes from said access signature and a fourth sequence of bytes from said access signature;

wherein the first terminal sends the first address and the second address to the second terminal and the second terminal sends the third address and the fourth address to the first terminal thereby to allow the first terminal and the second terminal to each generate from the access signature the four sequences of bytes represented by the four addresses in the possession of the first terminal and the second terminal;

wherein the first terminal and the second terminal each add the first address and the third address to generate a fifth address and each add the second address and the fourth address to generate a sixth address and wherein the fifth address and the sixth address are each used to generate two sequences of bytes, a fifth sequence and a sixth sequence, at both the first terminal and the second terminal; and wherein a session signature is generated at both the first terminal and the second terminal by exclusively ORing the fifth sequence of bytes and the sixth sequence of bytes.

17. The method of encrypting information which comprises:

providing a first sequence of bits and a second sequence of bits in a first compartment and a second compartment, respectively, both compartments being in the possession of two or more clients being served by a server (hereinafter the two compartments are denoted as two compartments of a "shared key bucket");

deriving a pair of pointers P1, P2 from the two compartments of the shared key bucket;

transmitting the pointers P1, P2 to a client wishing to encrypt information;

encrypting information at the client utilizing a sequence of bits derived from the shared key bucket using the pointers P1, P2 (hereinafter this sequence of bits is called the "encryption key");

providing at the server two pointers $p_1$, $p_2$ for use with a DES keys bucket;

using the pointers $p_1$, $p_2$ to derive two DES keys from the DES keys bucket at the server;

obtaining a derived DES key by exclusively ORing the two DES keys at the server;

using the deriving DES key to encrypt P1, P2 (the encrypted P1, P2 are hereinafter called a "seal");

transmitting the seal and the DES pointers $p_1$, $p_2$ to the client; and storing in memory the document encrypted by the encryption key, the seal and the DES pointers $p_1$, $p_2$.

18. The method of claim 17 including the steps of:

decrypting the document stored in memory by:
- transmitting the seal and the DES pointers $p_1$, $p_2$ from storage to the server;
- unlocking the seal using the DES pointers $p_1$, $p_2$ and the DES keys bucket at the server thereby to obtain the pointers $p_1$, $p_2$;
- transmitting the pointers P1, P2 to the client;
- transmitting the encrypted document to the client from memory; and
- at the client decoding the encrypted document using the session key obtained using the unsealed pointers P1, P2 received from the server.

19. The method of claim 18 including the steps of:
- establishing a private access line between the server and the client prior to the transmission of the pointers P1, P2 from the server to the client; and
- establishing a private access line between the client and the server prior to transmitting the seal and the DES pointers $p_1$, $p_2$ from storage to the server.

20. A masking method for masking the addresses associated with an access signature, the addresses to be transmitted from a first terminal to a second terminal to thereby eliminate the possibility of retrieving the user's access signature from transmitted addresses, the method comprising:
- specifying two pointers P1, P2 at the first terminal;
- specifying two additional pointers P1', P2' at the second terminal;
- transmitting the pointers P1, P2 from the first terminal to the second terminal;
- deriving at the second terminal an additional pair of address pointers $\overline{P1}$, $\overline{P2}$, by using pointer P1 and pointer P1' to obtain pointer $\overline{P1}$, and using pointer P2 and P2' to obtain pointer $\overline{P2}$;
- generating a masking signature at the second terminal from pointers $\overline{P1}$, $\overline{P2}$;
- generating at the second terminal two pointers P3, P4;
- encrypting pointers P3, P4 using the masking signature at the second terminal; and
- transmitting the encrypted pointers P3, P4 to the first terminal along with the pointers P1', P2'.

21. The method of claim 20 including the additional step of:
- using the pointers P1', P2' at the first terminal along with the pointers P1, P2 already at the first terminal to generate the masking signature;
- using the masking signature to decrypt the encrypted pointers P3, P4; and
- using pointers P3, P4 to generate the session signature for use in encrypting information to be transmitted from the second terminal to the first terminal and vice versa.

22. The method of claim 21 wherein the step of deriving the at the second terminal an additional pair of address pointers $\overline{P1}$, $\overline{P2}$ comprises:
- adding pointer P1 and pointer P1' to obtain pointer $\overline{P1}$; and
- adding pointer P2 and pointer P2' to obtain pointer $\overline{P2}$.

* * * * *